H. M. SCHNIPPEL.
MEASURING IMPLEMENT.
APPLICATION FILED APR. 24, 1918.

1,298,579.

Patented Mar. 25, 1919.

Witnesses

Inventor
H. M. Schnippel,
By Victor J. Evans
Attorney

UNITED STATES PATENT OFFICE.

HARRY M. SCHNIPPEL, OF SHELBYVILLE, INDIANA.

MEASURING IMPLEMENT.

1,298,579. Specification of Letters Patent. Patented Mar. 25, 1919.

Application filed April 24, 1918. Serial No. 230,505.

*To all whom it may concern:*

Be it known that I, HARRY M. SCHNIPPEL, a citizen of the United States, residing at Shelbyville, in the county of Shelby and State of Indiana, have invented new and useful Improvements in Measuring Implements, of which the following is a specification.

This invention relates to a measuring implement which may be advantageously employed when fitting orthopedic devices and especially those employed to support fallen arches.

The primary object of the invention is to provide an inexpensive and durable measuring implement of this character which may also be employed in fitting foot-wear and is so constructed that an arch support measuring device slidably connected with one side of a graduated rod may be detached from the rod and connected with the opposite side thereof thus, enabling the implement to be used for the purposes stated above in connection with either the right or left foot.

A further object of the invention is to provide the implement with an arch support measuring device which is so constructed and mounted upon the graduated rod that the device may be yieldably held against movement upon the rod or firmly fixed thereto as the occasion requires.

With these and other objects in view the invention resides in the novel combination and arrangement of parts which will be hereinafter described and claimed.

In the drawing:—

Like characters of reference denote the corresponding parts throughout the various views in the drawing.

Figure 1:
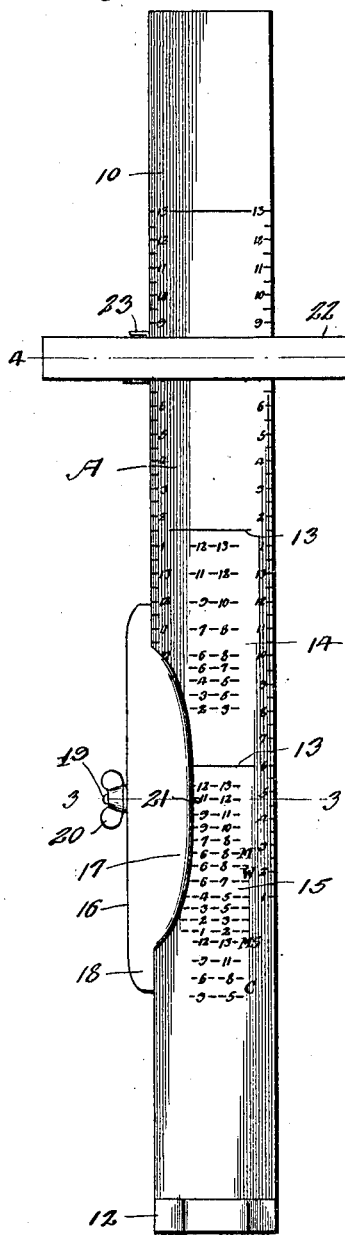
Figure 1 is a top plan view of a measuring implement constructed in accordance with the invention.
Figure 2:
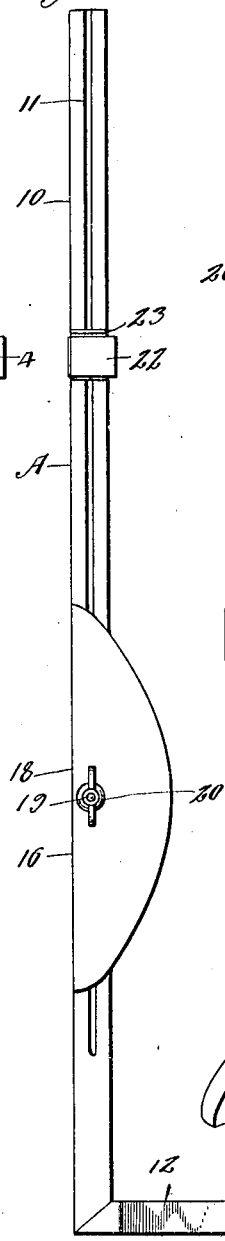
Fig. 2 is a view in side elevation.
Figure 3:
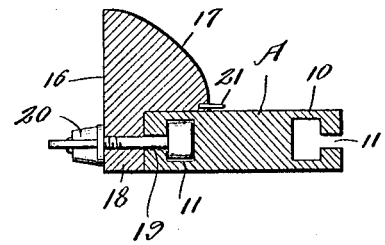
Fig. 3 is a section on the line 3—3 of Fig. 1.
Figure 4:
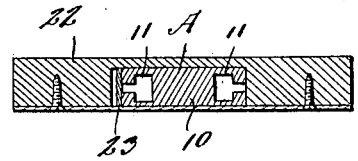
Fig. 4 is a cross section upon the line 4—4 of Fig. 1.
Figure 5:
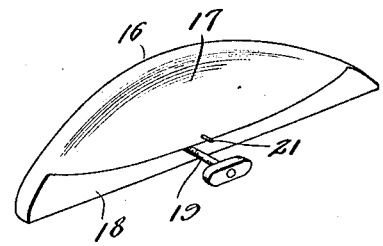
Fig. 5 is a detailed perspective view of the arch support measuring device comprising a part of the measuring implement.

Referring now to the drawing in detail, the letter A designates a measuring implement which is primarily intended to be employed in fitting orthopedic devices which serve as supports for fallen arches, although the construction of the implement is such that it may be employed in fitting foot-wear if desired.

The measuring implement A when constructed in accordance with the invention includes a rod 10 of rectangular shape in cross section and provided upon opposite sides with T-shaped grooves 11. Fixed to one end of the rod 10 is a heel plate 12 which extends above the upper face of the rod. The rod has indicated thereon by straight and transversely extending lines 13, panels 14 and 15. Carried upon the upper face of the rod 10 in the area covered by the panels 14 and 15 are numbered graduations which indicate the size of the various orthopedic devices which are used to correct deformities of the feet.

Disposed upon the upper face of the rod 10 is an arch support measuring device 16 which is provided with a face 17 which is curved both transversely and longitudinally throughout its length. The device 16 extends beyond one of the grooved sides of the rod 10 and has formed on its bottom face a flange 18 through which passes a screw bolt, 19, the head of which is seated in the T-shaped groove. The device may be clamped to the rod by means of a winged nut 20 engaging with said bolt. The flange 18 engages the side edge of the rod as shown. The device 16 has fixed thereto at the base of its curved face 17 a pointer 21 which as the device is moved longitudinally of the rod 10 registers with the numbered graduations in the panels 14 and 15 and indicates the size of the orthopedic device desired. It will, of course, be understood that the device 16 may be used on either side of the rod 10.

The rod 10 is passed through an opening intermediate the ends of a bar 22 which is yieldably held against movement upon the rod 10 by a spring 23. The bar 22 is adapted to be employed to determine the length of a person's foot in order that they may be supplied with foot-wear of the proper length and to enable the bar to be employed for this purpose the rod 10 has formed on its upper face spaced rows of numbered graduations which correspond to the sizes of the foot-wear commonly carried in stock.

To use this orthopedic measuring instrument in the fitting of inner longitudinal arch supports, the device 16 is placed on the correct side, according to the foot intended to be measured, so that the device will fit in the hollow of the foot, or instep, when the foot is placed on the device. The measure is taken with the middle or highest point of the device in the hollow of the foot. The thumb nut is then tightened to keep the device from moving while the patient removes his foot. The indicator 21 on the device will point to the numeral indicating the size of the support required.

In case of metatarsalgia, or callouses directly back of the toes, the cross bar 22 is used in connection with the aforesaid manner of measuring. To ascertain the proper length of support required in this case, place cross bar 22 under the foot so that the callouses are directly on cross bar, and proceed as before. This will show the length of support required, as the support must be fitted long enough to reach directly back of the heads of the fallen metatarsal bones.

As a measure to determine length of foot in the fitting of shoes, the device 16 should be loosely connected with the rod so as to yield to the instep of the foot. The foot is placed on the rod and the cross bar 22 moved until it touches the end of the big toe. The two rows of figures on either side of the rod, for right or left foot measurements, at end of big toe, gives the correct length of shoe.

Shoes should be fitted according to the following rules.

1 inch longer than foot, D and E widths.
1½ inches longer than foot, B and C widths.
2 inches longer than foot, A and AA widths.

From the foregoing description taken in connection with the accompanying drawing it is apparent that an inexpensive measuring implement for the purpose set forth has been provided which will enable most footwear and arch supports to be correctly fitted.

Having thus described my invention what is claimed as new is:—

1. A device of the class described comprising a graduated rod, and an arch support measuring device movable longitudinally of the rod, said device consisting of a block provided with a face which is curved both transversely and longitudinally throughout its length.

2. A device of the class described comprising a graduated rod, a cross bar having an opening therein through which the rod passes, spring means for holding the bar in adjusted position on the rod, and an arch support measuring device slidably and detachably connected with said rod.

3. A device of the class described comprising a graduated rod, an arch support measuring device detachably and adjustably mounted on said rod, said device consisting of a block having one of its faces curved transversely and longitudinally throughout its length, and means carried by the latter device and engageable with said rod to clamp the device in adjusted position.

4. A device of the class described comprising a rod of rectangular shape in cross section having grooves in opposite sides thereof, an arch support measuring device on said rod, a flange on the bottom of said device contiguous to one of the grooved sides of said rod, a bolt having its head fitting within the groove in the rod and passing through the device and a nut engaging said bolt.

In testimony whereof I affix my signature.

HARRY M. SCHNIPPEL.

Copies of this patent may be obtained for five cents each, by addressing the "Commissioner of Patents, Washington, D. C."